United States Patent
Fye et al.

(10) Patent No.: US 6,654,602 B1
(45) Date of Patent: Nov. 25, 2003

(54) SERVICES FOR SUBSCRIBER UNITS WITH DISSIMILAR SERVICE CONFIGURATION CAPABILITIES

(75) Inventors: Donald Mugar Fye, Marietta, GA (US); Steven Regitz, Marietta, GA (US)

(73) Assignee: GTE Wireless Service Corporation, Alpharetta, GA (US)

( * ) Notice: Subject to any disclaimer, the term of this patent is extended or adjusted under 35 U.S.C. 154(b) by 0 days.

(21) Appl. No.: 09/549,896

(22) Filed: Apr. 14, 2000

(51) Int. Cl.$^7$ ................................................ H04M 3/42
(52) U.S. Cl. ........................ 455/414; 455/418; 455/419
(58) Field of Search ................................ 455/414, 418, 455/419, 560

(56) References Cited

U.S. PATENT DOCUMENTS

| | | | | |
|---|---|---|---|---|
| 5,903,845 A | * | 5/1999 | Buhrmann et al. | ......... 455/461 |
| 5,991,642 A | * | 11/1999 | Watanabe et al. | ........... 455/560 |
| 6,006,189 A | * | 12/1999 | Strawczynski et al. | ..... 704/270 |
| 6,243,590 B1 | * | 6/2001 | Reddy et al. | ................ 455/510 |
| 6,256,612 B1 | * | 7/2001 | Vo et al. | ....................... 704/500 |
| 6,353,737 B1 | * | 3/2002 | Herzog | ........................ 455/418 |
| 6,363,339 B1 | * | 3/2002 | Rabipour et al. | ............ 704/201 |

OTHER PUBLICATIONS

TIA/EIA–95–B Standard "Mobile Station–Base Station Compatibility for Wideband Spread Spectrum Cellular Systems" dated Mar. 1999 pp. 7–89–7–130, 7–183–7–194, 7–215–7–236, 7–265–7–268, 7–307–7–316, and 7–369–7–372.

* cited by examiner

Primary Examiner—William Trost
Assistant Examiner—James D Ewart

(57) ABSTRACT

A wireless telecommunication network communicates with a population of subscriber units. A portion of the subscriber units may be programmed to practice a less desirable service configuration, such as a default 13 kb/s vocoding process, even though capable of practicing a more desirable service configuration, such as enhanced variable rate coding (EVRC). Another portion of the subscriber units may not be capable of performing the more desirable service configuration. The network includes a database used to filter the application of a negotiation process during call setup for calls originating at the subscriber units. The negotiation process requests subscriber units to implement the more desirable service configuration. The database is automatically populated through an exchange of messages which occurs during a call setup process for incoming calls to the subscriber units.

5 Claims, 3 Drawing Sheets

SERVICES FOR SUBSCRIBER UNITS WITH DISSIMILAR SERVICE CONFIGURATION CAPABILITIES

TECHNICAL FIELD OF THE INVENTION

The present invention relates generally to the field of wireless telecommunication. More specifically, the present invention relates to the management of telecommunication services in wireless networks which support populations of subscriber units having dissimilar service configuration capabilities.

BACKGROUND OF THE INVENTION

Those who provide wireless telecommunication services are typically licensed to use a specified portion of the electromagnetic spectrum within a specified geographical area. The more efficiently the provider uses the licensed spectrum, the more call traffic that can be conveyed, and the more revenues the provider can generate. Accordingly, service providers are motivated to use their licensed spectrum as efficiently as possible.

A progression of wireless communication standards has evolved. Generally, the spectrum is used more efficiently when telecommunication services are delivered in accordance with newer standards than when services are delivered in accordance with older standards. For example, older analog standards, such as the advanced mobile phone service (AMPS) set forth in TIA/EIA-553 use the spectrum less efficiently than more modern digital standards, one example of which is TIA/EIA-95-B, entitled: "Mobile Station-Base Station Compatibility Standard for Wideband Spread Spectrum Cellular Systems", March 1999 (hereinafter TIA/EIA-95).

However, during a transition period which may continue indefinitely, newer standards coexist with older standards. To minimize waste of a service provider's infrastructure and to maintain compatibility with an existing customer base, both newer and older standards are practiced simultaneously. This transition period and the coexistence of multiple standards generates numerous dilemmas.

For example, the TIA/EIA-95 CDMA standard has contemplated various features which were not implemented by some mobile switching center (MSC) manufacturers and by some subscriber unit manufacturers at first because few then-existing subscriber units or MSC's could take advantage of the features. The negotiation of certain service configurations is one such imperfectly-implemented feature. While subscriber units and MSC's might not have been perfectly compliant with published specifications, they nevertheless functioned acceptably well because the newer features were not needed.

Subscriber units then began to provide newer capabilities, all still in compliance with standards. One such newer capability is EVRC. However, in order to remain compatible with home and roamed-upon networks that could not operate with the newer capabilities, such subscriber units were programmed to default-out the newer capability. In particular, a large number of EVRC-capable subscriber units have been programmed to originate calls using the older 13 kb/s vocoding rate so that they could operate on systems that did not offer the EVRC service. Unfortunately, when thus programmed EVRC-capable subscriber units operate on EVRC-capable systems, they continue to originate calls using the older 13 kb/s vocoding standard even though both subscriber unit and MSC support the newer, more spectrally efficient standard. Since the vast majority of cellular calls originate at subscriber units, a significant waste of spectrum results.

One option for minimizing this unnecessary waste of spectrum would be to reprogram subscriber units to default to the newer capability, e.g., EVRC, in an existing customer base when the network supports the newer capability. However, this option is highly undesirable because it causes customer inconvenience and requires customer cooperation. Moreover, it can still prevent subscriber unit operation when the subscriber unit roams on networks which are not EVRC capable.

Another option for minimizing this unnecessary waste of spectrum is to follow the Service Negotiation or Service Order Negotiation processes set forth in the TIA/EIA-95 CDMA standard to negotiate subscriber units that originate calls into implementing EVRC. Negotiation processes generally occur when a first station, either a base or mobile, requests a service configuration of a second station, either a mobile or base. If the requested service configuration is acceptable, the second station may accept the requested service by returning an appropriate response message. If the requested service configuration is not acceptable to the second station, the second station may request an alternate service configuration of the first station. The first station may then accept the requested alternate service configuration or request yet another alternate service configuration, and so on.

While the negotiation processes work acceptably well in a population of homogeneous subscriber units having similar service configuration capabilities, these processes produce unwanted consequences in a heterogeneous population of subscriber units having dissimilar service configuration capabilities. The negotiation processes risk denying service or providing a less spectrally efficient protocol when used with subscriber units not capable of providing the desired service configuration, such as EVRC. In particular, if a base station were to request an alternate service configuration, such as EVRC, after a mobile station has requested a different service configuration, such as the default 13 kb/s service, conventional mobile stations would interpret the alternate request as a denial of the original request, e.g., a denial of 13 kb/s service. If the subscriber unit was not EVRC-capable, then the negotiation process would lead to the selection of analog service or to denial of service. Accordingly, a service provider may not simply attempt to negotiate a subscriber unit to EVRC service because the negotiation processes set forth in the standards would lead to a less efficient use of spectrum or a denial of service, which is an even worse consequence, if attempted on a subscriber unit not capable of providing the desired service configuration.

A database may be used to specify the service configuration capabilities of various subscriber units. Using such a database, a network may then negotiate subscriber units capable of implementing more than one service configuration to a more desired service configuration without unduly risking a denial of service or operation in accordance with an even less desired service configuration, such as analog service. Unfortunately, conventional techniques for forming such a database lead to undesirable and unreliable results. Cooperation from an assortment of different manufacturers of subscriber units may be required to obtain the data needed to populate the database. Such data are often unreliable and stale. Moreover, such data are often manually entered, which leads to further errors due to human factors. In addition, even if such data are obtained in an accurate form and entered in an accurate manner, the data soon become stale due to constant vendor revisions to subscriber units.

SUMMARY OF THE INVENTION

It is an advantage of the present invention that an improved method and wireless telecommunication network provide services for subscriber units with dissimilar service configuration capabilities.

Another advantage of the present invention is that a database is used to filter the application of a negotiation process which, when enabled by the database, negotiates subscriber units to alternate service configurations.

Another advantage of the present invention is that subscriber units that do exhibit only older service configuration capabilities are not negotiated away from their preferred service configurations.

Another advantage of the present invention is that subscriber units which are capable of newer service configurations may nevertheless default to less-preferred, older service configurations compatible with a wide range of networks, but be negotiated to the newer service configurations when the newer service configurations are supported.

These and other advantages are realized in one form by an improved method of operating a wireless telecommunication network to accommodate a population of subscriber units exhibiting dissimilar service configuration capabilities. The method calls for automatically storing, in a database, data specifying whether a subscriber unit is capable of providing a subject service configuration. A request to place an outgoing call from the subscriber unit is received. The database is evaluated to determine if said subscriber unit is capable of providing the subject service configuration. If this evaluation indicates that the subscriber unit is capable of providing the subject service configuration, the subscriber unit is requested to implement the subject service configuration.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
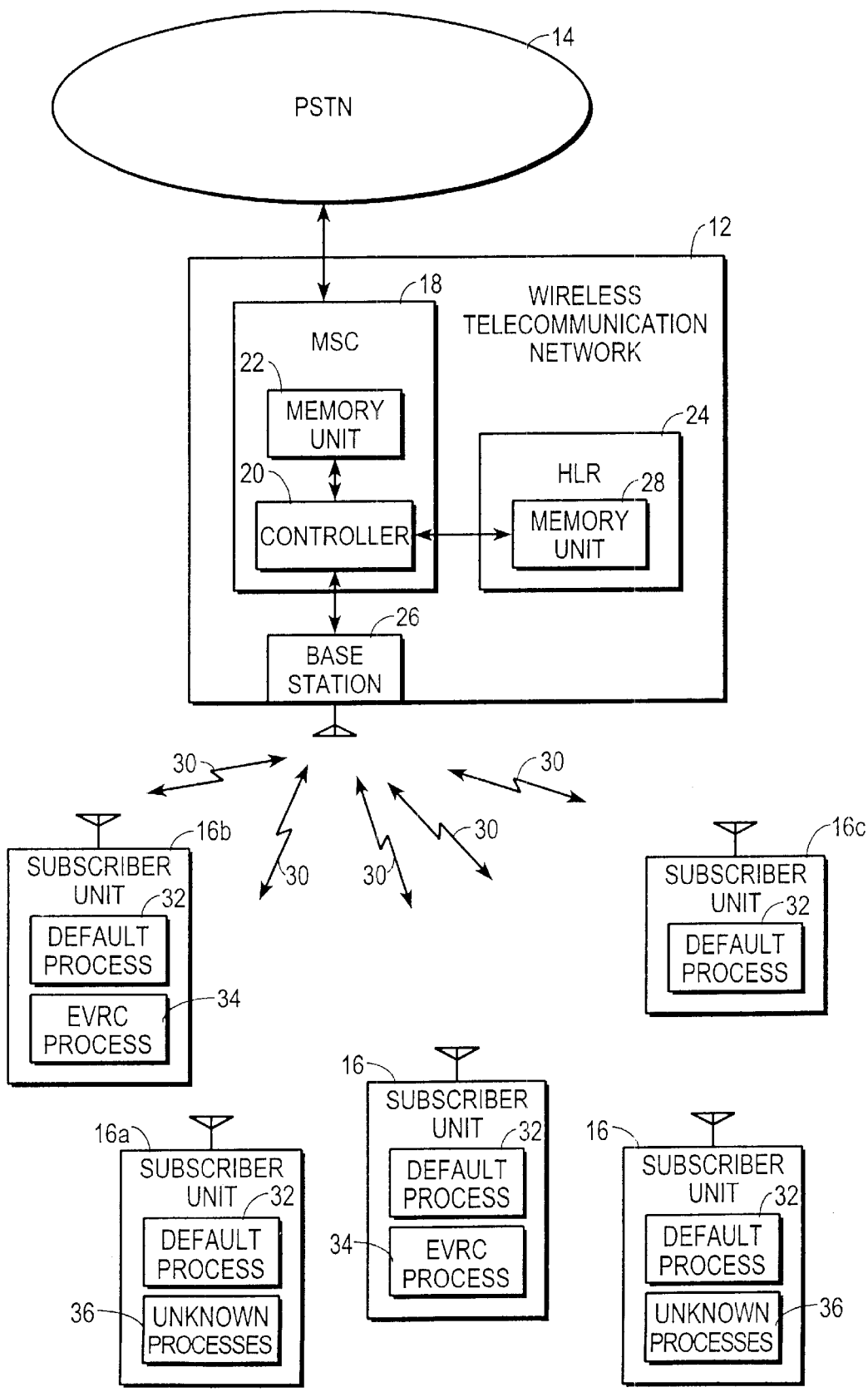
FIG. 1 shows a block diagram of an environment in which a wireless telecommunication network operates.

FIG. 1 shows a block diagram of an environment 10 in which a wireless telecommunication network 12 operates. Environment 10 includes network 12, a public switched telecommunications network (PSTN) 14, and a population of subscriber units 16. Subscriber units 16 may be referred to as mobile stations by some skilled in the art, but whether or not referred to as mobile stations, nothing requires subscriber units 16 to be mobile.

Network 12 includes a mobile switching center (MSC) 18. Through MSC 18, network 12 may communicate with other telephony devices throughout the world using PSTN 14. MSC 18 is a switch providing services and coordination between subscriber units 16 and other telephony devices throughout the world and is desirably the location of a digital access and cross-connect system (DACS) for network 12. MSC 18 includes a controller 20 which couples to a memory unit 22. Controller 20 is a computerized device which carries out instructions specified in computer software. Memory unit 22 contains various tables, lists, or other types of databases and programming instructions used by controller 20 in establishing the functions performed by MSC 18. MSC 18 couples to a home location register (HLR) 24 and any number of base stations 26 (one shown). HLR 24 is characterized, at least in part, by a memory unit 28 in which is stored data related to subscriber features and services. However, in some systems, this memory unit function is included in the MSC. Base station 26 includes, in part, the transmitter and receiver hardware that supports wireless communication links 30 with subscriber units 16. Links 30 include the various types of channels which are common in cellular telephony, including pilot channels, paging and access channels, traffic channels, and the like.

Subscriber units 16 exhibit dissimilar service configuration capabilities. Service configurations characterize how communication services are provided to subscriber units 16 by network 12. Some of subscriber units 16 may possess capabilities to perform a given function in more than one way. For example, a service configuration of interest in the preferred embodiment concerns a vocoding process to be utilized by subscriber units 16 and MSC 18. All subscriber units 16 in the population of interest are likely to be capable of implementing a default vocoding process 32. However, only a portion of subscriber units 16 may be additionally capable of implementing an enhanced vocoding process 34. In another example, some subscriber units 16 may be capable of performing some function which other subscriber units 16 may not be able to perform. In yet another example, all subscriber units 16 in the population of interest are likely to be capable of implementing a process having nothing to do with vocoding to perform some function, but some of the subscriber units 16 may be additionally capable of implementing an alternate form of the process.

In the preferred embodiment, subscriber units 16 and network 12 operate in general compliance with the TIA/EIA-95 standard for CDMA cellular services. Default decoding process 32 processes digital data exhibiting a data rate of around 13 kb/s. Enhanced vocoding process 34 is generally compliant with IS-127, and is known to those skilled in the art as enhanced variable rate coding (EVRC). Those skilled in the art will appreciate that generally equal voice quality to that achieved by default process 32 may be achieved by EVRC process 34, even though EVRC process 34 processes digital data at a data rate of around 8 kb/s. The lower data rate of EVRC process 34 is attractive to the operators of network 12 because the lower data allows each call to consume a smaller portion of the scarce spectrum licensed to the operators. Thus, by operating at the enhanced vocoding rate of process 34, network 12 can convey a greater number of calls in a given geographical area using a given spectrum.

While the preferred embodiment described herein focuses primarily on a vocoding service configuration, the present invention is not so limited but may apply and achieve desirable results when used with other service configurations. Likewise, while the preferred embodiment described herein focuses primarily on the delivery of telecommunication services in accordance with a particular standard, namely TIA/EIA-95, the present invention is not so limited but may apply and achieve desirable results when used with other standards, such as GSM, TDMA, third generation cellular mobile systems, and the like.

Network 12 employs a database, discussed below, stored in a memory unit, such as memory unit 22 or 28, which is accessible to a programmable control unit of network 12, such as controller 20. This database stores data which identifies service configuration capabilities of subscriber units 16. This database gives network 12 a priori knowledge of subscriber unit 16 service configuration capabilities. Using this a priori knowledge, network 12 then negotiates subscriber units 16 capable of implementing more than one service configuration for a given function, such as vocoding, to a desired service configuration, such as EVRC, without unduly risking a denial of service or operation in accordance with an even less desirable service configuration, such as analog service.

As described below in more detail, in the preferred embodiment the database is populated in an automatic and convenient manner which achieves robust results. Generally, the database is populated in response to an exchange of messages between network 12 and subscriber units 16. Subscriber units 16 which have not yet been involved in such an exchange of messages, such as subscriber unit 16a, are assumed by network 12 to be capable of default process 32 and various unknown processes 36. Subscriber units 16 which have been involved in the exchange of messages are listed in the database as being EVRC capable, such as a subscriber unit 16b, or not EVRC capable, such as a subscriber unit 16c. Robust results are obtained because cooperation from an assortment of different manufacturers of subscriber units 16 is not required, and errors which often occur in such manufacturer-supplied data and in manually entered data are largely prevented.

Figure 2:
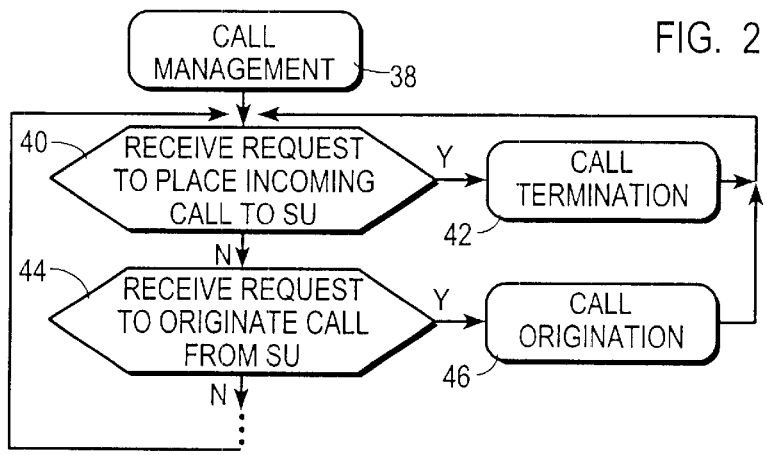
FIG. 2 shows a flow chart of a call management process performed by the wireless telecommunication network.

FIG. 2 shows a flow chart of a call management process 38 performed by wireless telecommunication network 12 (FIG. 1). In particular, call management process 38 is performed by a controller in network 12 in response to software programming which the controller executes. Such a controller may be controller 20 (FIG. 1) or another controller within network 12. In general, process 38 responds to requests to provide telecommunication services for subscriber units 16 (FIG. 1).

A query task 40 of process 38 determines whether network 12 has received a request to place an incoming call to a subscriber unit (SU) 16. The request is most often received from PSTN 14, but such a request may originate from another subscriber unit 16 that communicates with network 12. If task 40 determines that such a request has been received, then a call termination process 42 is performed for the specific call request and specified subscriber unit 16. Call termination process 42 is discussed in more detail below in connection with FIG. 3. Following call termination process 42, call management process 38 repeats.

When task 40 determines that no request to terminate a call at a subscriber unit 16 has been received, a query task 44 is performed. Task 44 determines whether network 12 has received a request to originate or otherwise place an outgoing call from a subscriber unit (SU) 16. The request is received from the originating subscriber unit 16 over an access channel of a communication link 30 (FIG. 1) and through a base station 26 (FIG. 1). If task 40 determines that such a request has been received, then a call origination process 46 is performed for the specific call request and specified subscriber unit 16. Call origination process 46 is discussed in more detail below in connection with FIG. 4. Following call origination process 46, call management process 38 repeats.

When task 44 fails to detect a request to originate a call, program control loops back to repeat call management process 38. As indicated by ellipses in FIG. 2, call management process 38 may include many other tasks less relevant to the present invention and therefore omitted from FIG. 2. Moreover, process 38 is desirably configured to permit process 38 to continue even though call termination and call origination processes 42 and 46 may be concurrently performed for various specific calls and subscriber units.

Figure 3:
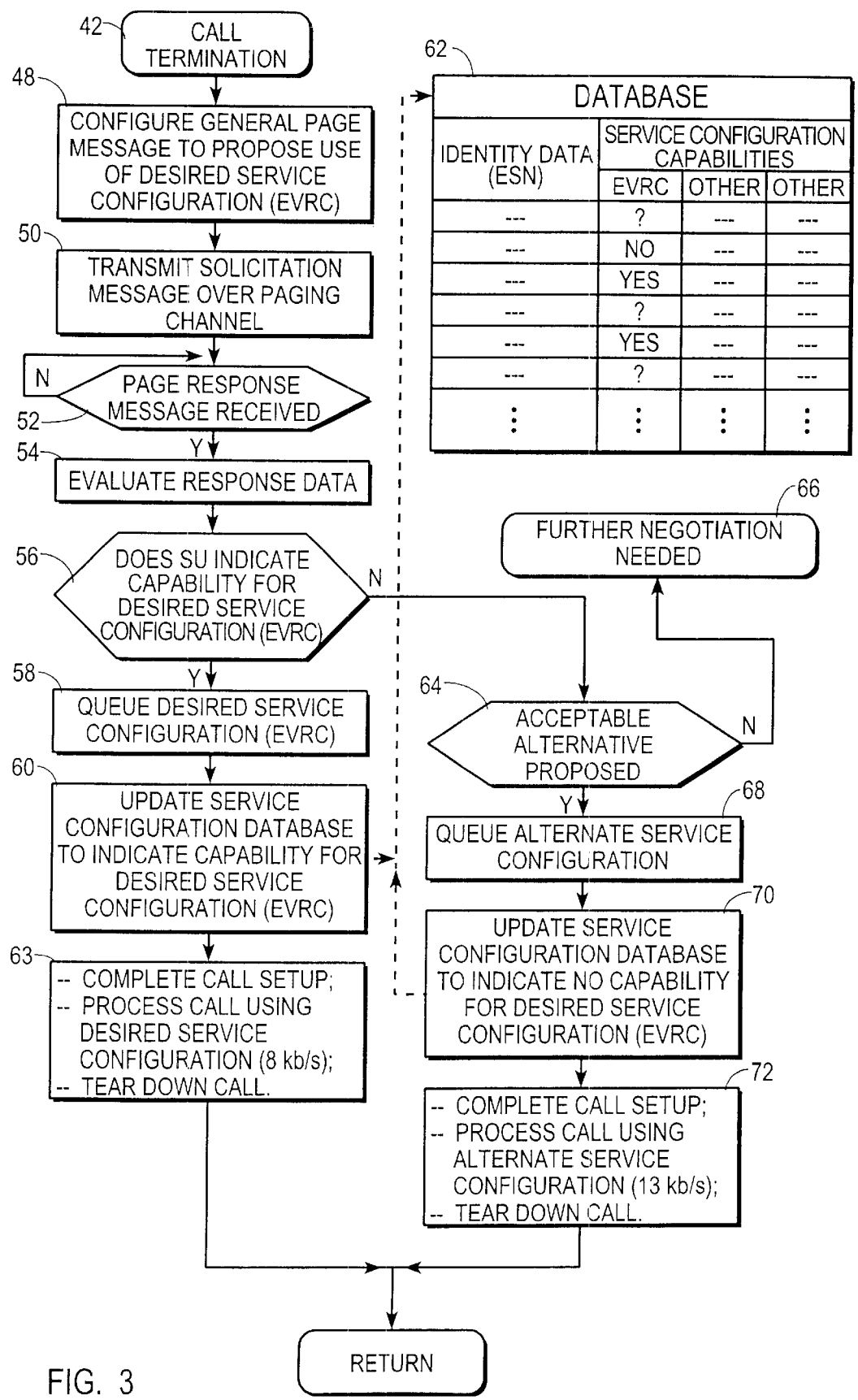
FIG. 3 shows a flow chart of a call termination process performed by the wireless telecommunication network.

FIG. 3 shows a flow chart of call termination process 42. Call termination process 42 is performed when an incoming call is being directed to a specified subscriber unit 16. For convenience, FIG. 3 illustrates process 42 as being performed for a single subscriber unit 16, but those skilled in the art will appreciate that process 42 may be concurrently performed any number of times to process any number of calls being terminated at any number of subscriber units 16.

Process 42 includes a task 48 which configures a message for sending to the subscriber unit 16. The message, among other things, conveys a request or proposal to implement a desired service configuration, such as EVRC. In the preferred embodiment, this request message may be configured as a general page message. The general page message also informs the subscriber unit 16 that an incoming call is being directed to it and includes a mobile identification number (MIN) or other address of the subscriber unit 16. Accordingly, no additional system overhead communications are required to request the desired service configuration of the subscriber unit 16.

Following task 48, a task 50 transmits the message to solicit the desired service configuration. In the preferred embodiment, the message is transmitted from base station 26 (FIG. 1) over a paging channel using a paging channel protocol known to both network 12 and subscriber units 16 and not subject to the EVRC process.

Next, a query task 52 determines whether a response message has been received from the subscriber unit 16. In the preferred embodiment, a page response message is sent by the subscriber unit 16 in response to the general page message. The page response message is typically received over an access channel of a communication link 30. It conveys data indicating whether the subscriber unit 16 is capable of performing or otherwise implementing the requested service configuration. If task 52 fails to detect the response message, then program control remains at task 52 until such a response is received. Of course, those skilled in the art will appreciate that an appropriate error handling routine (not shown) may be included to abort call termination process 42 should no response be forthcoming.

When task 52 detects a response message, a task 54 evaluates the data which responds to the request. The data which responds to the request may take one of three forms. In one form, the data may indicate that the subscriber unit 16 is capable of performing the requested service configuration. In a second form, the data may indicate that the subscriber unit 16 is proposing an alternate service configuration. In a third form, the data may indicate that the subscriber unit 16 does not know how to properly respond to the request, therefore the response data has no particular meaning to the subscriber unit 16. The second and third forms may both be treated as a proposal for an alternate service configuration, with the third form being treated as a request for the default service configuration, e.g., 13 kb/s service.

Following task 54, a query task 56 determines whether the subscriber unit (SU) 16 has indicated a capability for the desired service configuration, such as EVRC. In the preferred embodiment, this indication results when the subscriber unit 16 echoes the requested service configuration in its response. If such a capability is indicated, a task 58 is performed to queue the desired service configuration. In other words, task 58 associates appropriate resources, such as software routines and hardware if necessary, with the proper channels so that the desired service configuration will be implemented. In the preferred embodiment, task 58 causes the EVRC process to be associated with a traffic channel that will be assigned to the subscriber unit 16 for the upcoming call.

Next, a task 60 updates a service configuration database 62 by storing appropriate data therein indicating that the specified subscriber unit 16 has the desired service configuration. Database 62 is desirably stored in a memory unit, such as memory unit 22 or 28 (FIG. 1), which is accessible to the controller performing process 42. Database 62 associates subscriber unit identity data with service configuration capabilities. The preferred embodiment uses an electronic serial number (ESN) of the subscriber unit 16, or a derivative thereof, as the identity data. Generally, the ESN is sent to network 12 from subscriber units 16 in messages, such as a page response message, and is therefore known to network 12 during task 60 in connection with the service configuration capability data. Moreover, the ESN tends to remain constant throughout the life of subscriber units 16 while other forms of identity data may change with reprogramming.

Database 62 may include any number of service configurations about which capabilities are recorded. FIG. 3 illustrates database 62 as including EVRC capability data and two categories of "other" data. EVRC capability data is indicated as any of three states: "yes," "no," and "?". The three states respectively correspond to a positively determined presence of an EVRC capability, a positively determined lack of an EVRC capability, and no determination concerning EVRC capability. Task 60 stores an indication that corresponds to a "yes" in the depiction of database 62 illustrated in FIG. 3.

Following task 60, a task 63 completes the call. In other words, task 60 includes the various subtasks conventionally performed in call termination processes. Such subtasks include completing the call setup process, processing the call, and tearing down the call when one party hangs up. Call setup completion may include such subtasks as authentication and assigning a traffic channel. Processing the call may include the performance of vocoding, power management and handoff processes. In this situation, the vocoding process performed during task 63 is the one queued above during task 58, i.e., the EVRC process. After task 63, program flow returns to repeat call management process 38 (FIG. 2).

Referring back to task 56, when the response from the subscriber unit 16 indicates that the subscriber unit 16 does not have the capability for the desired service configuration, such as EVRC, then a query task 64 is performed. Query task 64 determines whether the response indicates an acceptable alternative. As a general rule, any proposed alternate service configuration of which network 12 is capable is deemed acceptable, and alternative proposals not specifically understood as being unacceptable are deemed to be the default service configuration, which is acceptable. However, if a subscriber unit 16 rejects the network's proposed service configuration and proposes an unacceptable alternative service configuration, then further negotiation is needed, as indicated by a further negotiation process 66. The further negotiation process 66 may take place on a traffic or paging channel and may result in convergence on a mutually acceptable, but less desirable service configuration, such as analog service, or denial of service.

In most cases, an acceptable alternate service configuration is expected to be the default process 32 (FIG. 1). When an acceptable alternate is discovered at task 64, a task 68 queues the alternate service configuration to associate appropriate resources, such as software routines and hardware if necessary, with the proper channels so that the desired service configuration will be implemented. In the preferred embodiment, task 68 causes a vocoding process other than the EVRC process, e.g., the default 13 kb/s process, to be associated with a traffic channel that will be assigned to the subscriber unit 16 for the upcoming call.

After task 68, a task 70 updates service configuration database 62 by storing appropriate data therein to indicate that the specified subscriber unit 16 does not have the desired service configuration. This indication corresponds to a "no" in the depiction of database 62 illustrated in FIG. 3. The indication data is stored in association with data which identify the subscriber unit 16, such as the ESN of the subscriber unit 16.

After task 70, a task 72 completes the call in much the same manner as task 63, discussed above. Task 70 completes call setup, process the call, and performs call tear down. However, during task 70 the call is processed using the alternate service configuration.queued above in task 68. After task 72, program flow returns to repeat call management process 38 (FIG. 2).

The above-described call termination process 42 depicted in FIG. 3 is one of many equivalent processes which could be devised to accomplish the same tasks. In one equivalent alternate process, task 48 could evaluate database 62 before configuring a general page message to request a desired service configuration. The request could be omitted altogether or omitted on occasion if database 62 contains a positive indication as to the service configuration capability for the subscriber unit 16. In another equivalent alternate process, other messages may be used to communicate the request and its response, and such other messages may be communicated over either page/access channels or traffic channels.

Figure 4:
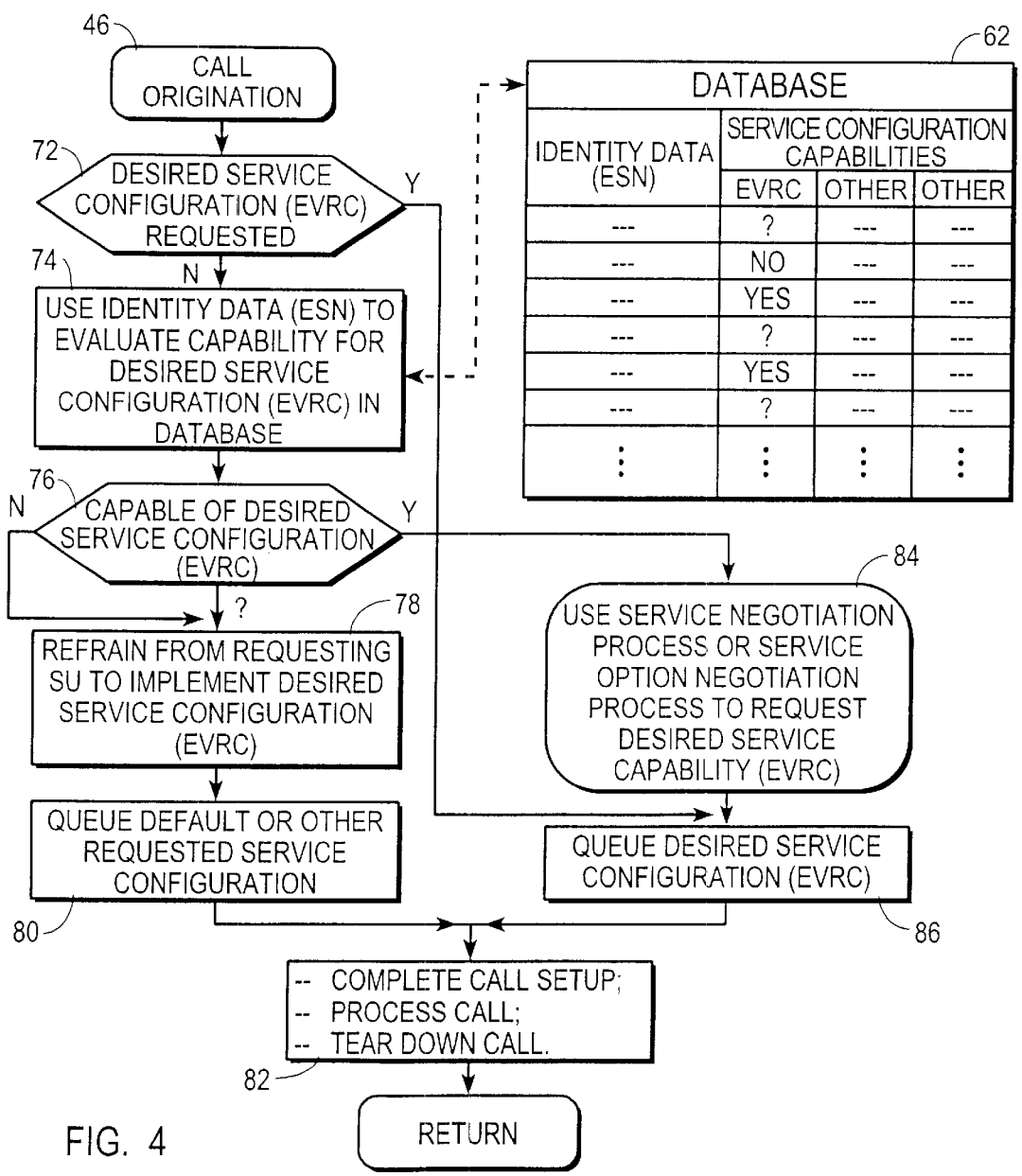
FIG. 4 shows a flow chart of a call origination process performed by the wireless telecommunication network.

FIG. 4 shows a flow chart of call origination process 46. Call origination process 46 is performed when a call is being originated from a specified subscriber unit 16. For convenience, FIG. 3 illustrates process 46 as being performed for a single subscriber unit 16, but those skilled in the art will appreciate that process 46 may be concurrently performed with processes 42 and 46 any number of times to process any number of calls being originated and terminated at any number of subscriber units 16.

Process 46 is performed when a request is received to provide telecommunication services, namely the origination and processing of a call for a subscriber unit 16. The request conveys, either explicitly or implicitly, a request to implement and perform a service configuration. For example, the request message may explicitly include a request for a specific service configuration, such as EVRC. Alternatively, the request message may implicitly request a default service configuration by making no such specific request.

Process 46 includes a query task 72 which determines whether a desired service configuration, such as EVRC, is being requested. In the preferred embodiment, a desired service configuration such as EVRC would be explicitly requested because any implicit request would be deemed as a request for the default service configuration. Moreover, one benefit of the present invention is that subscriber units 16 may be programmed to request a default service configuration, such as the 13 kb/s vocoding service, even though they are EVRC-capable. This programming permits them to roam on other networks which may not be EVRC-capable.

If task 72 determines that the desired service configuration is not being requested, the usual situation, then a task 74 evaluates database 62. In particular, task 74 uses identity data, such as the ESN, from the request for service as a key to see whether that subscriber unit 16 is capable of performing the desired service configuration.

Following task 74, a query task 76 determines the results of the evaluation of task 74. If database 62 contains no data which positively indicates that the subscriber unit 16 is capable of performing the desired service configuration, then task 76 fails to determine that the subscriber unit 16 is capable of performing the desired service configuration. In other words, task 74 fails if database 62,associates data corresponding to either the "no" or "?" indications in the FIGS. 3–4 depictions of database 62. In one alternate embodiment, database 62 may be initialized with a default indication corresponding to "no" for all subscriber units 16, then the default condition could be overwritten with a "yes" indication as network 12 learns that various subscriber units 16 are capable of the desired EVRC service configuration. In this alternate configuration, task 76, or the equivalent, would detect only indications corresponding to "yes" or "no".

When task 76 fails, a task 78 refrains from requesting the subscriber unit (SU) 16 to implement the desired service configuration. By affirmatively refraining from making such a request, network 12 lessens the risks of denying service to the subscriber unit 16 or of negotiating for analog service. Next, a task 80 queues the default or other requested service configuration for use in the upcoming call, and a task 82 completes the call by completing the call setup process, processing the call using the service configuration queued above in task 80, and then tearing down the call at the call's completion. After task 82, program control returns to repeat call management process 38 (FIG. 2).

Referring back to task 76, when task 76 determines that the subscriber unit 16 requesting a call origination is capable of implementing the desired service configuration, a negotiation process 84 is performed. Negotiation process 84 requests the subscriber unit 16 to implement the desired service configuration. In the preferred embodiment, process 84 uses either the service negotiation process or the service option negotiation process as set forth in TIA/EIA-95 to request a desired service capability, such as EVRC, of the subscriber unit 16. This negotiation may take place over paging/access channels, traffic channels, or a combination of the two, and may take advantage of any of numerous message types.

Following the negotiation of process 84, a task 86 is performed to queue the desired service configuration (e.g., EVRC) for use in the upcoming call, and task 82 completes the call by completing the call setup process, processing the call using the service configuration queued above in task 86, and then tearing down the call at the call's completion. After task 82, program control returns to repeat call management process 38 (FIG. 2).

In summary, the present invention provides an improved method and wireless telecommunication network which provide services for subscriber units with dissimilar service configuration capabilities. A database is used to filter the application of a negotiation process which, when enabled by the database, negotiates subscriber units to alternate service configurations. Subscriber units that exhibit only older service configuration capabilities are not negotiated away from their preferred service configurations. Subscriber units which are capable of newer service configurations may default to less-preferred, older service configurations compatible with a wide range of networks, but be negotiated to newer service configurations when the newer service configurations are supported. The database is automatically populated and maintained through the exchange of messages between the network and subscriber units. This eliminates the need to manually populate the database. Complex coordination with different subscriber unit manufacturers is not required, and manual data entry errors can be minimized.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A method of operating a wireless telecommunication network to accommodate a population of subscriber units exhibiting dissimilar service configuration capabilities, said method comprising:

automatically storing, in a database, data specifying whether a subscriber unit is capable of providing a first service configuration by transmitting, to said subscriber unit, a request message requesting said subscriber unit to provide said first service configuration, and receiving from said subscriber unit a response message which conveys data responding to said request message;

receiving a request to implement a second service configuration from said subscriber unit;

evaluating said database to determine if said subscriber unit is capable of providing said first service configuration; and if said evaluating activity determines that said subscriber unit is capable of providing said first service configuration, requesting said subscriber unit to implement said first service configuration.

2. A method as claimed in claim 1 wherein said transmitting activity is performed in response to detecting an incoming call directed to said subscriber unit.

3. A method as claimed in claim 1 wherein:

said first service configuration is implemented by performing a first vocoding process which processes digital data exhibiting a first data rate; and said second service configuration is implemented by performing a second vocoding process which processes digital data exhibiting a second data rate, said second data rate being greater than said first data rate.

4. A method of operating a wireless telecommunication network to accommodate a population of subscriber units exhibiting dissimilar service configuration capabilities, said method comprising:

automatically storing, in a database, data specifying whether a subscriber unit is capable of providing a subject service configuration by soliciting said subscriber unit to provide said subject service configuration, and receiving from said subscriber unit a response which conveys data responding to said soliciting activity, wherein:

said soliciting activity comprises transmitting a general page message to said subscriber unit, said general page message being configured to propose the use of enhanced variable rate coding; and said response received from said subscriber unit is a page response message which conveys one of an acceptance of said enhanced variable rate coding and a proposal of an alternate service configuration;

receiving a request to originate a call from said subscriber unit;

evaluating said database to determine if said subscriber unit is capable of providing said subject service configuration; and if said evaluating activity determines that said subscriber unit is capable of providing said subject service configuration, requesting said subscriber unit to implement said subject service configuration.

5. A method of operating a wireless telecommunication network to accommodate a population of subscriber units exhibiting dissimilar service configuration capabilities, said method comprising:

transmitting, to a subscriber unit in said population of subscriber units, a request message requesting said subscriber unit to provide a first service configuration, said request message being a general page message configured to propose the use of enhanced variable rate coding;

receiving, from said subscriber unit, a page response message which conveys one of an acceptance of said enhanced variable rate coding and a proposal of an alternate service configuration;

updating a database to reflect said data indicating whether said subscriber unit is capable of providing said first service configuration; and requesting said subscriber unit to implement said first service configuration when requested to provide telecommunications services for said subscriber unit and when said database-indicates that said subscriber unit has a capability to implement said first service configuration.

* * * * *